US006657842B2

(12) United States Patent
Krause

(10) Patent No.: US 6,657,842 B2
(45) Date of Patent: Dec. 2, 2003

(54) DISCONNECTOR ASSEMBLY FOR AN ARRESTOR

(75) Inventor: John A. Krause, Medina, OH (US)

(73) Assignee: Hubbell Incorporated, Orange, CT (US)

(*) Notice: Subject to any disclaimer, the term of this patent is extended or adjusted under 35 U.S.C. 154(b) by 0 days.

(21) Appl. No.: 10/051,384

(22) Filed: Jan. 22, 2002

(65) Prior Publication Data

US 2003/0137792 A1 Jul. 24, 2003

(51) Int. Cl.[7] .................... H02H 3/22
(52) U.S. Cl. .................... 361/117
(58) Field of Search .................... 361/117–131

(56) References Cited

U.S. PATENT DOCUMENTS

| | | | | |
|---|---|---|---|---|
| 4,729,053 A | | 3/1988 | Maier et al. | 361/118 |
| 4,899,248 A | | 2/1990 | Raudabaugh | 361/127 |
| 4,930,039 A | | 5/1990 | Woodworth et al. | 361/127 |
| 5,434,550 A | * | 7/1995 | Putt | 337/31 |
| 5,680,289 A | * | 10/1997 | Robinson et al. | 361/127 |
| 5,923,518 A | | 7/1999 | Hensley | 361/117 |
| 5,952,910 A | | 9/1999 | Krause | 337/30 |

* cited by examiner

*Primary Examiner*—Gregory J. Toatley, Jr.
*Assistant Examiner*—Boris Benenson
(74) *Attorney, Agent, or Firm*—Mark S. Bicks; Tara L. Hoffman; Alfred N. Goodman

(57) ABSTRACT

A disconnector assembly connects and then isolates and disconnects an arrestor between a power line and ground. The disconnector assembly has a bracket that has a base and a wall. The wall extends substantially perpendicularly from the base and defines a cavity. An isolator assembly is disposed within the cavity. A cap is connected to the wall remote from the base to close the cavity. A blind bore extends into the cap from a surface thereof remote from the cavity. A stud is partially disposed in the bore. An adhesive between the cap and the wall secures the cap to the wall.

50 Claims, 2 Drawing Sheets

DISCONNECTOR ASSEMBLY FOR AN ARRESTOR

BACKGROUND OF THE INVENTION

Lighting or surge arrestors are typically connected to power lines to carry electrical surge currents to ground, thereby preventing damage to lines and equipment connected to the arrestors. Arrestors offer high resistance to normal voltage across power lines, but offer very low resistance to surge currents produced by sudden high voltage conditions caused by, for example, lighting strikes, switching surge currents or temporary overvoltages. After the surge, the voltage drops and the arrestor normally returns to a high resistance state. However, upon arrestor malfunction or failure, the high resistance state is not resumed, and the arrestor continues to provide an electrical path from the power line to ground. Ultimately, the line will fail due to a short circuit condition or breakdown of the distribution transformers, and the arrestor will require replacement.

To avoid line failure, disconnector assemblies are commonly used in conjunction with arrestors to separate a malfunctioning arrestor from the circuit and to provide a visual indication of arrestor failure. Conventional disconnector assemblies have an explosive charge to destroy the circuit path and physically separate the electrical terminals. Examples of such disconnector assemblies are disclosed in U.S. Pat. No. 5,952,910 to Krause and U.S. Pat. Nos. 5,057,810 and 5,113,167 to Raudabaugh, as well as U.S. Pat. No. 5,434,550 to Putt and U.S. Pat. No. 4,471,402 to Cunningham, the subject matter of each of which are hereby incorporated by reference.

However, conventional disconnector assemblies have components loaded within the bracket cavity. Adhesive is used to secure the ground terminal within the bracket. Often, the ground terminals become misaligned before the adhesive cures, thereby rendering the disconnector assembly unfit for use.

Additionally, the adhesive may flow into the internal cavity housing the isolator assembly, thereby contaminating the isolator assembly by interfering with the electrical contacts and rendering the disconnector assembly unfit for use. A gasket may be positioned between the ground terminal and the isolator assembly to prevent contamination of the isolator assembly by the adhesive. However, the gasket does not eliminate flow of the adhesive into the bracket cavity.

Furthermore, contamination may adhere to the adhesive, thereby forming an electrical track or path across the adhesive. Such an electrical track lowers the insulation resistance of the arrestor, which renders the arrestor unfit for use as an insulator.

Production of such unfit disconnector assemblies is costly, as well as time consuming. Manufacturing disconnector assemblies requiring extra parts to protect the isolator assembly increases inventory in addition to increasing costs and manufacturing times.

A need exists for an improved disconnector assembly for an arrestor that overcomes the aforementioned problems.

SUMMARY OF THE INVENTION

Accordingly, it is a primary objective of the present invention to provide a disconnector assembly for an arrestor having a ground terminal partially disposed in a bore in a cap to reduce the possibility of the ground terminal becoming misaligned during manufacture of the disconnector assembly.

A further objective of the present invention is to provide a disconnector assembly for an arrestor that requires less adhesive for securing the cap to the bracket, thereby reducing both the likelihood of contaminating the isolator assembly and manufacturing costs.

A still further objective of the present invention is to provide a disconnector assembly for an arrestor that having a cap that encapsulates the adhesive, thereby eliminating electrical tracking due to contamination build-up on the adhesive.

The foregoing objects are basically attained by providing an assembly for an arrestor. The assembly has a bracket that has a base and a wall. The wall extends substantially perpendicularly from the base and defines a cavity. An isolator assembly is disposed within the cavity. A cap is connected to the wall remote from the base to close the cavity. A bore extends into the cap from a surface thereof remote from the cavity. A stud is partially disposed in the bore. An adhesive between the cap and the wall secures the cap to the wall.

The stud is partially disposed in the bore in the cap, thereby eliminating misalignment of the stud. Less adhesive is required to secure the cap to the bracket, thereby reducing the likelihood of contaminating the isolator assembly with the adhesive and eliminating the need for a gasket between the cap and the isolator assembly. Since the adhesive is encapsulated by the cap, contamination is not able to form an electrical path across the adhesive, thereby preventing the occurrence of electrical tracking.

Other objects, advantages and salient features of the invention will become apparent from the following detailed description, which, taken in conjunction with the annexed drawings, discloses a preferred embodiment of the invention.

BRIEF DESCRIPTION OF THE DRAWINGS

Referring now to the drawings that form a part of the original disclosure.

DETAILED DESCRIPTION OF THE INVENTION

Figure 1:
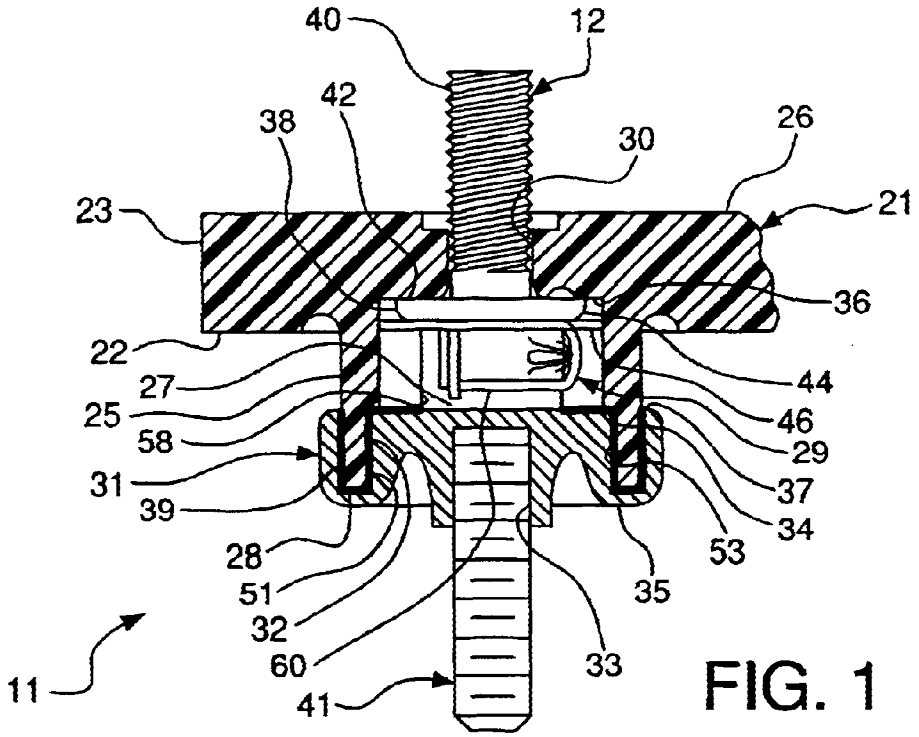
FIG. 1 is a side elevational view in cross section of a disconnector assembly according to the present invention.

As shown in FIGS. 1–5, the present invention relates to a disconnector assembly 11 for connecting and then isolating and disconnecting an arrestor 13 between a power line 15 and ground 17. The disconnector assembly 11 has a bracket 21 that has a base 23 and a wall 25. The wall 25 extends substantially perpendicularly from the base 23 and defines a cavity 27. An isolator assembly 29 is disposed within the cavity 27. A cap 31 is connected to the wall 25 remote from the base 23 to close the cavity 27. A bore 33 extends into the cap 31 from a surface 35 thereof remote from the cavity 27. A stud 41 is partially disposed in the bore 33. An adhesive 51 between the cap 31 and the wall 25 secures the cap to the wall.

Figure 2:
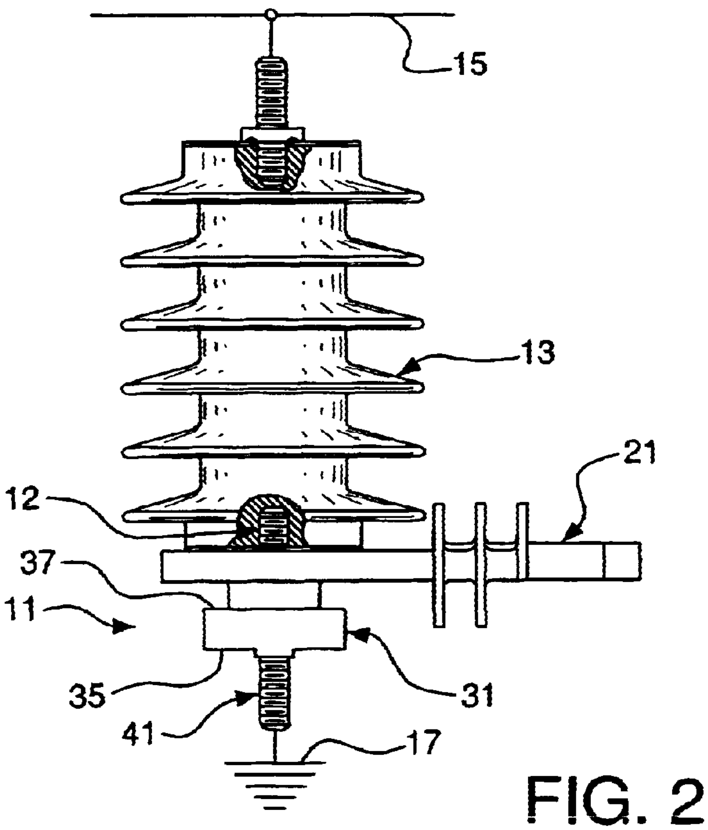
FIG. 2 is a side elevational view of the disconnector assembly of FIG. 1 connected to an arrestor in partial cross section.

Referring initially to FIGS. 1 and 2, a disconnector assembly 11, according to the present invention, comprises a first, upper electrical terminal 12 electrically connected to arrestor 13, and a second, lower electrical terminal, or stud, 41 electrically connected to ground 17. Arrestor 13 is electrically connected to power line 15, which is representative of a power system. Terminals 12 and 41 are mechanically and electrically coupled to each other.

Arrestor 13 is conventional, and thus, is not described in detail. The arrestor may be formed according to U.S. Pat. No. 4,656,555 to Raudabaugh, the subject matter of which is hereby incorporated by reference.

Terminals 12 and 41 are mechanically connected to one another by a bracket 21. Bracket 21 may be formed of any suitably strong insulating material, such as a non-conductive plastic. Preferably, the bracket is made of a glass filled polyester material. As noted above, the bracket 21 has a base 23 and a wall 25 extending substantially perpendicularly from base 23, with wall 25 defining an internal cavity 27 extending between surface 22 of base 23 and surface 28 of wall 25. The upper end of cavity 27 is connected to bracket surface 26 by cylindrical upper bore 30. The lower end of cavity 27 is connected to surface 28 of wall 25 by a stepped lower chamber 32. The transverse diameter of lower chamber 32 is greater than the transverse diameter of internal cavity 27.

Between cavity 27 and lower chamber 32, the bracket has a radially extending lower annular shoulder 34. An upper shoulder 36 extends radially at the interface of cavity 27 and upper bore 30.

Upper electrical terminal 12 is of conventional construction, and has a head portion 38 located within cavity 27 and abutting upper shoulder 36. An externally threaded shank portion 40 of terminal 12 extends from the head portion through upper bore 30, such that the shank portion is at least partially exposed exteriorly of bracket 21 for coupling to arrestor 13. In this manner, head portion surface 42 engages upper shoulder 36, while head portion surface 44 is exposed in cavity 27.

An isolator assembly 29 is disposed in cavity 27. The isolator assembly may include a resistor 58, a cartridge 60, a spring 46 and a spacer. The spring 46 abuts surface 44 of terminal head portion 38. Spring 46 provides a biasing force to maintain electrical or physical contact of the isolator assembly components within cavity 27, and facilitates electrically connecting upper terminal 12 to lower terminal (stud) 41.

Solid cylindrical resistor 58 is mounted in cavity 27 and extends between spring 46 and upper surface of cap 31, thereby providing a resistive electrical connection between the upper and lower terminals 12 and 41 through conductive cap 31.

Cartridge 60 with an explosive charge is mounted in cavity 27 adjacent resistor 58. Cartridge 60 is elongated along a cartridge axis which is substantially perpendicular to the longitudinal axis of terminals 12 and 41 and of bracket cavity 27. The configuration of cartridge 60 is generally cylindrical with one end being tapered. The lateral exterior of cartridge 60 may be substantially covered or surrounded by a gap spacer to prevent movement of the cartridge within cavity 27. Alternatively, cartridge 60 may be held loosely within cavity 27. However, allowing such movement may cause the assembly to rattle, which may be considered to be undesirable in certain environments.

Figure 3:
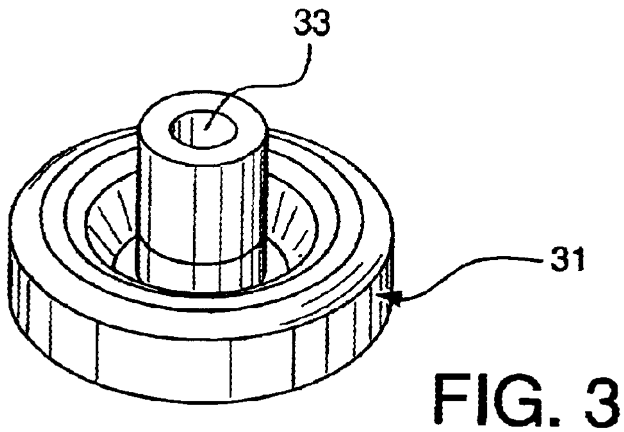
FIG. 3 is a perspective view of the cap of the disconnector assembly of FIG. 1.
Figure 4:
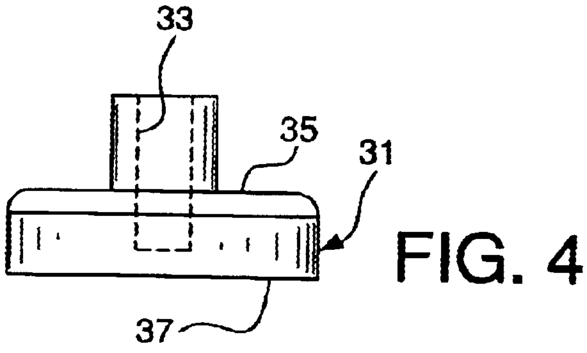
FIG. 4 is a side elevational view of the cap of FIG. 3.
Figure 5:
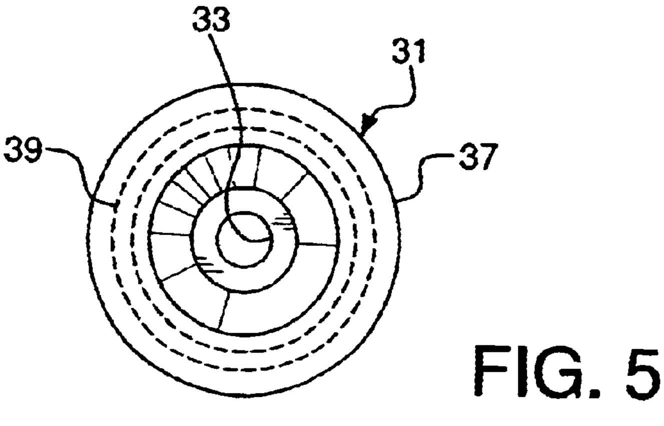
FIG. 5 is a top plan view of the cap of FIG. 3.

As shown in FIGS. 3–5, cap 31 is connected to the wall 25 remote from the base 23 to close the cavity 27. Preferably, cap 31 has a substantially annular shape. Cap 31 has a surface 37 for connecting to wall 25 of bracket 21. Surface 37 has a groove 39 for receiving distal surface 28 of wall 25. Preferably, a press fit is created between cap 31 and wall 25. Preferably, groove 39 is substantially circular. Bore 33 extends into cap 31 from surface 35 that is remote from cavity 27. Bore 33 extends only partially through cap 31, as shown in FIG. 1. Cap 31 is made of any conductive material, such as plastic or metal. Preferably, cap 31 is die cast.

Lower terminal 41 is a conventional stud. Lower terminal, or stud, 41 has a shank portion 50 received by bore 33 in cap 31, such that the stud is only partially disposed in the bore. Stud 41 is maintained in position in bore 33 by any suitable method, including, but not limited to, threading, welding, forming and crimping.

An adhesive 51 between the cap 31 and the wall 25 secures cap 31 to wall 25. Preferably, adhesive 51 is disposed in groove 39 of cap 31, and on distal surface 28 of wall 25, inner surface 53 of wall 25, and radially inwardly extending lower shoulder 34. The adhesive secures cap 31 to wall 25 of bracket 21, in addition to the press fit. Any suitable adhesive may be used, but preferably the adhesive is a thick epoxy that has a fast curing time in air to avoid contaminating the isolator assembly during the manufacturing process. Since adhesive 51 is completely encapsulated by cap 31 and bracket 21, erosion and contamination of the adhesive is prevented, thereby preventing loosening of the cap over time and eliminating adhesive tracking problems.

Assembly and Disassembly

A fully assembled disconnector assembly 11 is shown in FIGS. 1 and 2. Upper electrical terminal 12 is inserted through bore 30 to connect bracket 21 to an arrestor 13. The isolator assembly 29 is then simply dropped into cavity 27 over terminal 12. Cavity 27 is then sealed by securing cap 31 to wall 25 of bracket 21 with adhesive 51. Disconnector assembly 11 is then completed by partially disposing stud 41 in bore 33 of cap 31.

During normal non-fault operation of the arrestor, little or no current passes through isolator assembly 29 due to the high resistance of the arrestor. When subjected to lighting or surge currents, the arrestor experiences high pulse currents which travel through arrestor 13 and isolator assembly 29. Within the isolator assembly, the current will arc over between spring 46 and conductive portion of the gap spacer for connection to terminal 41 and to ground 17.

When the arrestor is properly functioning, the gaps spark over for high current, short duration pulses which last less than 100 milliseconds for lightening and less than several milliseconds for switching currents. For such short sparkovers, insufficient energy is generated to activate or denote the cartridge. However, if the lightening arrestor fails to withstand the voltages, the arcs are generated over a sufficiently extended period to activate the unprimed cartridge, causing explosion that separates the terminals mechanically from one another. The force of the exploded charge forces at least one of the terminals, usually lower terminal 41, from the housing. This action electrically disconnects arrestor 13 from the system, and provides a visual indication of the need for arrestor replacement.

While an advantageous embodiment has been chosen to illustrate the invention, it will be understood by those skilled in the art that various changes and modifications may be made therein without departing from the scope of the invention as defined in the appended claims.

What is claimed is:

1. An arrestor assembly, comprising:

an arrestor;

a bracket having a base and a wall extending substantially perpendicularly from said base and defining a cavity, said base having an opening extending therethrough for receiving a fastener to secure said base to the arrestor, an inner surface of said wall being stepped;

an isolator assembly disposed within said cavity;

a cap connected to said wall remote from said base and proximal said stepped surface to close said cavity and having a blind bore extending into said cap from a surface thereof remote from said cavity, said cap having a substantially circular groove extending axially for receiving said wall;

a stud partially disposed in said bore; and an adhesive between said cap and said wall to secure said cap to said wall.

2. An arrestor assembly for an arrestor according to claim 1, wherein said adhesive is an epoxy.

3. An arrestor assembly for an arrestor according to claim 1, wherein said bracket is made of a non-conductive plastic.

4. An arrestor assembly for an arrestor according to claim 1, wherein said cap is made of a conductive metal.

5. An arrestor assembly for an arrestor according to claim 1, wherein said cap is die-cast.

6. An arrestor assembly for an arrestor according to claim 1, wherein said cap is made of a conductive plastic.

7. An assembly for an arrestor, comprising:

a bracket having a base and a wall extending substantially perpendicularly from said base and defining a cavity;

an isolator assembly disposed within said cavity;

a cap connected to said wall remote from said base to close said cavity and having a blind bore extending into said cap from a surface thereof remote from said cavity, said cap having a groove for receiving said wall;

a stud partially disposed in said bore; and an adhesive between said cap and said wall to secure said cap to said wall.

8. An assembly for an arrestor according to claim 7, wherein said groove is substantially circular and extends axially in said cap.

9. An assembly for an arrestor according to claim 7, wherein said cap is substantially annular.

10. An assembly for an arrestor according to claim 7, wherein said adhesive is an epoxy.

11. An assembly for an arrestor according to claim 7, wherein an inner surface of said wall is stepped for receiving said cap.

12. An assembly for an arrestor according to claim 7, wherein said base has an opening extending therethrough for receiving a fastener to secure said base to the arrestor.

13. An assembly for an arrestor according to claim 7, wherein said bracket is made of a non-conductive plastic.

14. An assembly for an arrestor according to claim 7, wherein said cap is made of a conductive metal.

15. An assembly for an arrestor according to claim 7, wherein said cap is die-cast.

16. An assembly for an arrestor according to claim 7, wherein said cap is made of a conductive plastic.

17. An assembly for an arrestor according to claim 7, wherein said stud is disposed in said bore by one of the group consisting of potting, threading, forming and crimping.

18. An assembly for an arrestor, comprising:

a bracket having a base and a wall extending substantially perpendicularly from said base and defining a cavity;

an isolator assembly disposed within said cavity;

a substantially annular cap connected to said wall remote from said base to close said cavity and having a blind bore extending into said cap from a surface thereof remote from said cavity;

a stud partially disposed in said bore; and an adhesive between said cap and said wall to secure said cap to said wall.

19. An assembly for an arrestor according to claim 18, wherein said cap has a groove for receiving said wall.

20. An assembly for an arrestor according to claim 19, wherein said groove is substantially circular and extends axially in said cap.

21. An assembly for an arrestor according to claim 18, wherein said adhesive is an epoxy.

22. An assembly for an arrestor according to claim 18, wherein an inner surface of said wall is stepped for receiving said cap.

23. An assembly for an arrestor according to claim 18, wherein said base has an opening extending therethrough for receiving a fastener to secure said base to the arrestor.

24. An assembly for an arrestor according to claim 18, wherein said bracket is made of a non-conductive plastic.

25. An assembly for an arrestor according to claim 18, wherein said cap is made of a conductive metal.

26. An assembly for an arrestor according to claim 18, wherein said cap is die-cast.

27. An assembly for an arrestor according to claim 18, wherein said cap is made of a conductive plastic.

28. An assembly for an arrestor according to claim 18, wherein said stud is disposed in said bore by one of the group consisting of potting, threading, forming and crimping.

29. An arrestor assembly, comprising:

an arrestor;

a bracket connected to the arrestor and having a base and a wall extending substantially perpendicularly from said base and defining a cavity;

an isolator assembly disposed within said cavity;

a cap connected to said wall remote from said base to close said cavity and having a blind bore extending into said cap from a surface thereof remote from said cavity, said cap having a groove for receiving said wall;

a stud partially disposed in said bore; and an adhesive between said cap and said wall to secure said cap to said wall.

30. An assembly for an arrestor according to claim 29, wherein said groove is substantially circular and extends axially in said cap.

31. An assembly for an arrestor according to claim 29, wherein said cap is substantially annular.

32. An arrestor assembly for an arrestor according to claim 29, wherein said adhesive is an epoxy.

33. An arrestor assembly for an arrestor according to claim 29, wherein an inner surface of said wall is stepped for receiving said cap.

34. An arrestor assembly for an arrestor according to claim 29, wherein said base has an opening extending therethrough for receiving a fastener to secure said base to the arrestor.

35. An arrestor assembly for an arrestor according to claim 29, wherein said bracket is made of a non-conductive plastic.

36. An arrestor assembly for an arrestor according to claim 29, wherein said cap is made of a conductive metal.

37. An arrestor assembly for an arrestor according to claim 29, wherein said cap is die-cast.

38. An arrestor assembly for an arrestor according to claim 29, wherein said cap is made of a conductive plastic.

39. An arrestor assembly for an arrestor according to claim 29, wherein said stud is disposed in said bore by one of the group consisting of potting, threading, forming and crimping.

40. An arrestor assembly, comprising:

an arrestor;

a bracket connected to the arrestor and having a base and a wall extending substantially perpendicularly from said base and defining a cavity;

an isolator assembly disposed within said cavity;

a substantially annular cap connected to said wall remote from said base to close said cavity and having a blind bore extending into said cap from a surface thereof remote from said cavity;

a stud partially disposed in said bore; and an adhesive between said cap and said wall to secure said cap to said wall.

41. An arrestor assembly according to claim 40, wherein said cap has a groove for receiving said wall.

42. An assembly for an arrestor according to claim 41, wherein said groove is substantially circular and extends axially in said cap.

43. An arrestor assembly for an arrestor according to claim 40, wherein said adhesive is an epoxy.

44. An arrestor assembly for an arrestor according to claim 40, wherein an inner surface of said wall is stepped for receiving said cap.

45. arrestor assembly for an arrestor according to claim 40, wherein said base has an opening extending therethrough for receiving a fastener to secure said base to the arrestor.

46. An arrestor assembly for an arrestor according to claim 40, wherein said bracket is made of a non-conductive plastic.

47. An arrestor assembly for an arrestor according to claim 40, wherein said cap is made of a conductive metal.

48. An arrestor assembly for an arrestor according to claim 40, wherein said cap is die-cast.

49. An arrestor assembly for an arrestor according to claim 40, wherein said cap is made of a conductive plastic.

50. An arrestor assembly for an arrestor according to claim 40, wherein said stud is disposed in said bore by one of the group consisting of potting, threading, forming and crimping.

* * * * *